(12) United States Patent
Wachsmuth et al.

(10) Patent No.: US 9,251,592 B2
(45) Date of Patent: Feb. 2, 2016

(54) PIXEL OBJECT DETECTION IN DIGITAL IMAGES METHOD AND SYSTEM

(71) Applicants: Friedemann Wachsmuth, Hamburg (DE); Richard Case, Hamburg (DE)

(72) Inventors: Friedemann Wachsmuth, Hamburg (DE); Richard Case, Hamburg (DE)

( * ) Notice: Subject to any disclaimer, the term of this patent is extended or adjusted under 35 U.S.C. 154(b) by 215 days.

(21) Appl. No.: 13/834,530

(22) Filed: Mar. 15, 2013

(65) Prior Publication Data

US 2014/0177963 A1 Jun. 26, 2014

(30) Foreign Application Priority Data

Dec. 22, 2012 (DE) .......................... 10 2012 025 337

(51) Int. Cl.
| | | |
|---|---|---|
| G06K 9/46 | (2006.01) | |
| G06K 9/66 | (2006.01) | |
| G06T 7/00 | (2006.01) | |
| G06F 3/0488 | (2013.01) | |

(52) U.S. Cl.
CPC .......... *G06T 7/0079* (2013.01); *G06F 3/04883* (2013.01); *G06T 7/0083* (2013.01); *G06F 2203/04806* (2013.01); *G06T 2200/24* (2013.01); *G06T 2207/10024* (2013.01); *G06T 2207/20096* (2013.01)

(58) Field of Classification Search
USPC .......................................... 382/190; 715/700
See application file for complete search history.

(56) References Cited

U.S. PATENT DOCUMENTS

| | | | |
|---|---|---|---|
| 2007/0222859 A1* | 9/2007 | Chang et al. .................. | 348/148 |
| 2011/0081083 A1* | 4/2011 | Lee et al. ...................... | 382/182 |
| 2014/0075393 A1* | 3/2014 | Mei et al. ...................... | 715/863 |

* cited by examiner

*Primary Examiner* — John Strege
(74) *Attorney, Agent, or Firm* — AEON Law; Adam L. K. Philipp

(57) ABSTRACT

A user touches a touch sensitive display or otherwise provides input comprising "stroke" gestures to trace areas which are to be the subject of post-processing functions. The stroke area is highlighted and can be added to or corrected by additional stroke and "erase" gestures. Pixel objects are detected proximate to the stroke area, with a precision based on the zoom level. Stroke gesture input may be received and pixel object determination may be performed in series or in parallel.

10 Claims, 17 Drawing Sheets

PIXEL OBJECT DETECTION IN DIGITAL IMAGES METHOD AND SYSTEM

CROSS-REFERENCE TO RELATED APPLICATION

This application claims the benefit of the filing date of application number 10 2012 025 337.0, filed Dec. 22, 2012, in Germany, which priority is claimed pursuant to the Paris Convention for the Protection of Industrial Property (613 O.G. 23, 53 Stat. 1748) and 35 U.S.C. Section 119(a), which application is incorporated into this application by this reference.

FIELD

This disclosure relates to object detection in digital images.

BACKGROUND

The following description includes information that may be useful in understanding the present invention. It is not an admission that any of the information provided herein is prior art or relevant to the presently claimed invention, or that any publication specifically or implicitly referenced is prior art.

Post-processing of digital photographs (also referred to herein as "digital images") has become a standard part of photographic workflow. As digital cameras have become more powerful computers in their own right, post-processing on the digital camera is often performed to avoid the extra time and processes required in transferring the digital photograph to a separate computer. Examples of post-processing effects and filters which are available on digital cameras include brightness, contrast, color saturation, white balance, sepia conversion, nostalgia filter, and simulation of chemical film processing.

However, such post-processing, when performed on a camera, is done in relation to the entire image because of the inability to define an often irregular subset of a photograph without the larger screen, mouse, and other tools which are not available on cameras. Even on a computer with a larger screen, mouse, and enhanced zoom capabilities, selecting an area for application of post-processing functions is time-consuming, complex, requires many different steps, is not adapted for use of a touchscreen interface, and places additional burdens on the host computer.

DETAILED DESCRIPTION

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Certain elements appear in various of the Figures with the same capitalized element text, but a different element number. When referred to herein with the capitalized element text but with no element number, these references should be understood to be largely equivalent and to refer to any of the elements with the same capitalized element text, though potentially with differences based on the computing device within which the various embodiments of the element appears.

Figure 1:
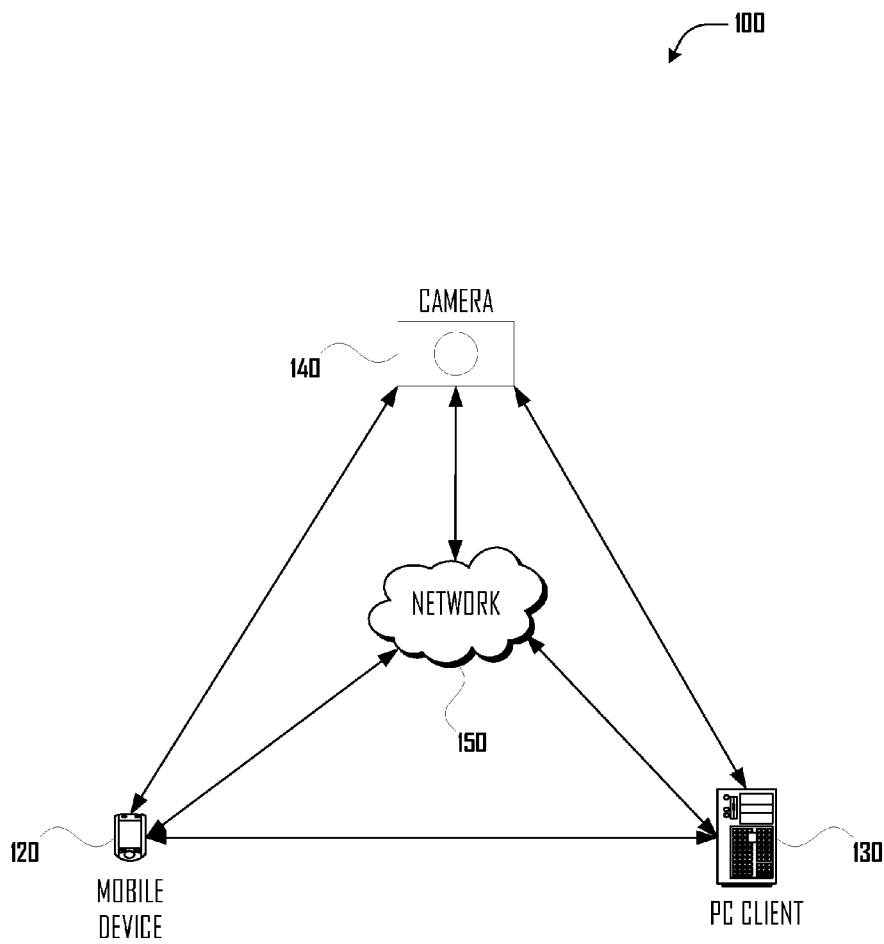
FIG. 1 is a network and device diagram illustrating exemplary computing devices configured according to embodiments disclosed in this paper.
Figure 2:
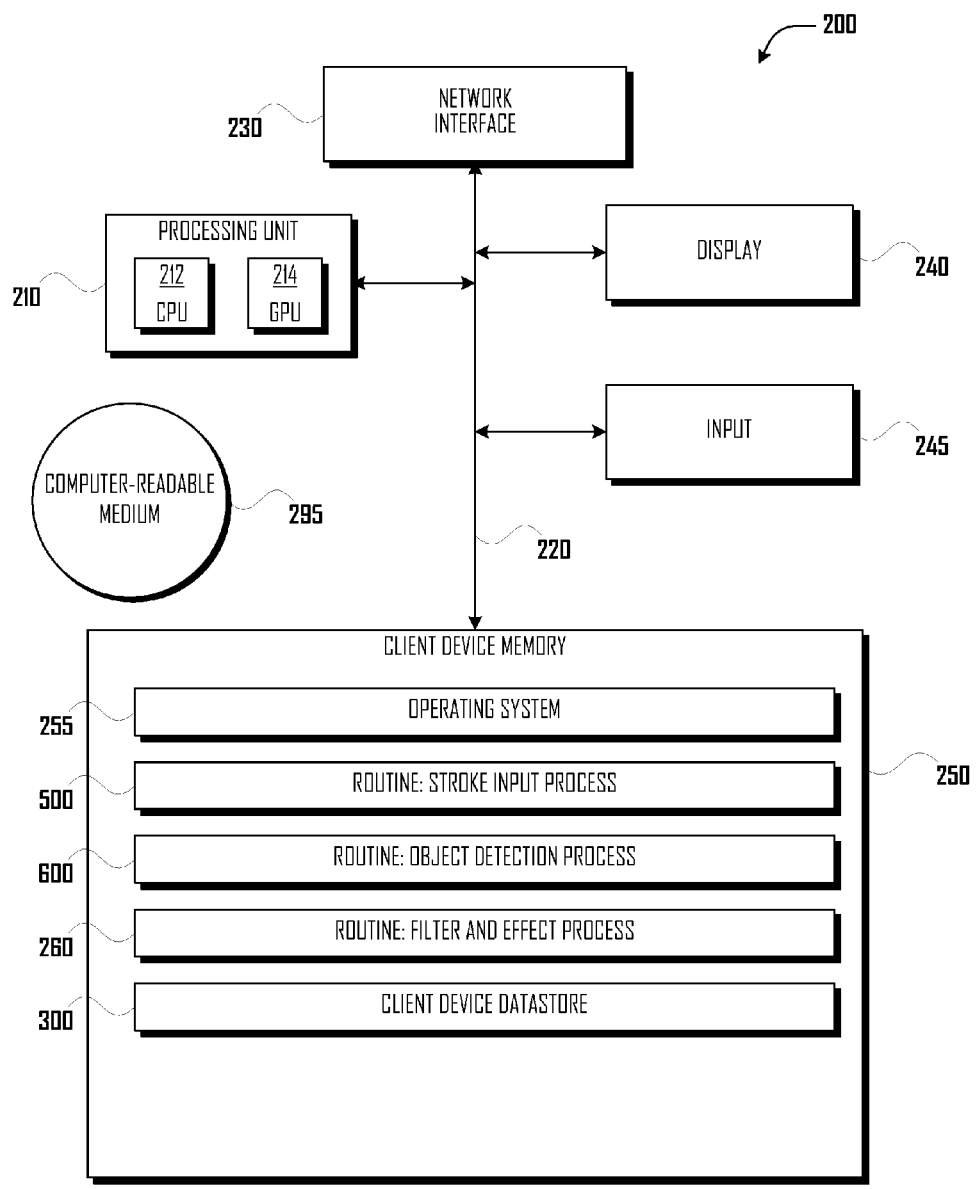
FIG. 2 is a functional block diagram of an exemplary Client Device computing device and some data structures and/or components thereof.

FIG. 1 is a network and device diagram illustrating exemplary computing devices configured according to embodiments disclosed in this paper. In FIG. 1, a Camera 140 computer, Mobile Device 120 computer, and PC Client 130 computer are illustrated as connecting to one another directly and/or via a Network 150, such as an Ethernet network, the Internet (which connection may be via a Wi-Fi connection), and/or a wireless network, such as a GSM, TDMA, CDMA, EDGE, HSPA, LTE or other network provided by a wireless service provider. The direct connections between the devices may be provided by network connections (similar to the network connection with Network 150, such as a Wi-Fi connection) and/or through a Blue-Tooth™, USB, or similar device-to-device connection. The Camera 140, Mobile Device 120, and PC Client 130 are similar computing devices, differing, for example, in the user interface which they provide to users, the Network 150 to which they connect, and/or the input and output hardware and software. The Camera 140, Mobile Device 120, and PC Client 130 are all referred to herein as a "Client Device." The Client Device is illustrated in FIG. 2. Examples of Client Devices include digital cameras, personal computers, laptop computers, tablet computers, smart phones, e-readers or similar computing devices. Client Devices are used by "users."

Connection to the Network 150 may require that the computers execute software routines which enable, for example, the seven layers of the OSI model of computer networking or equivalent in a wireless phone network. The Network 150 comprises computers, network connections among the computers, and software routines to enable communication between the computers over the network connections.

As discussed further herein, a Client Device comprises data comprising a digital photograph, hereinafter referred to as "Buffer I" (illustrated as "Buffer I" in FIG. 3 at element 305). A first Client Device may be used to take the digital photograph or may be used to process a digital photograph taken by a second Client Device and transferred or transmitted to the first Client Device.

Figure 10:
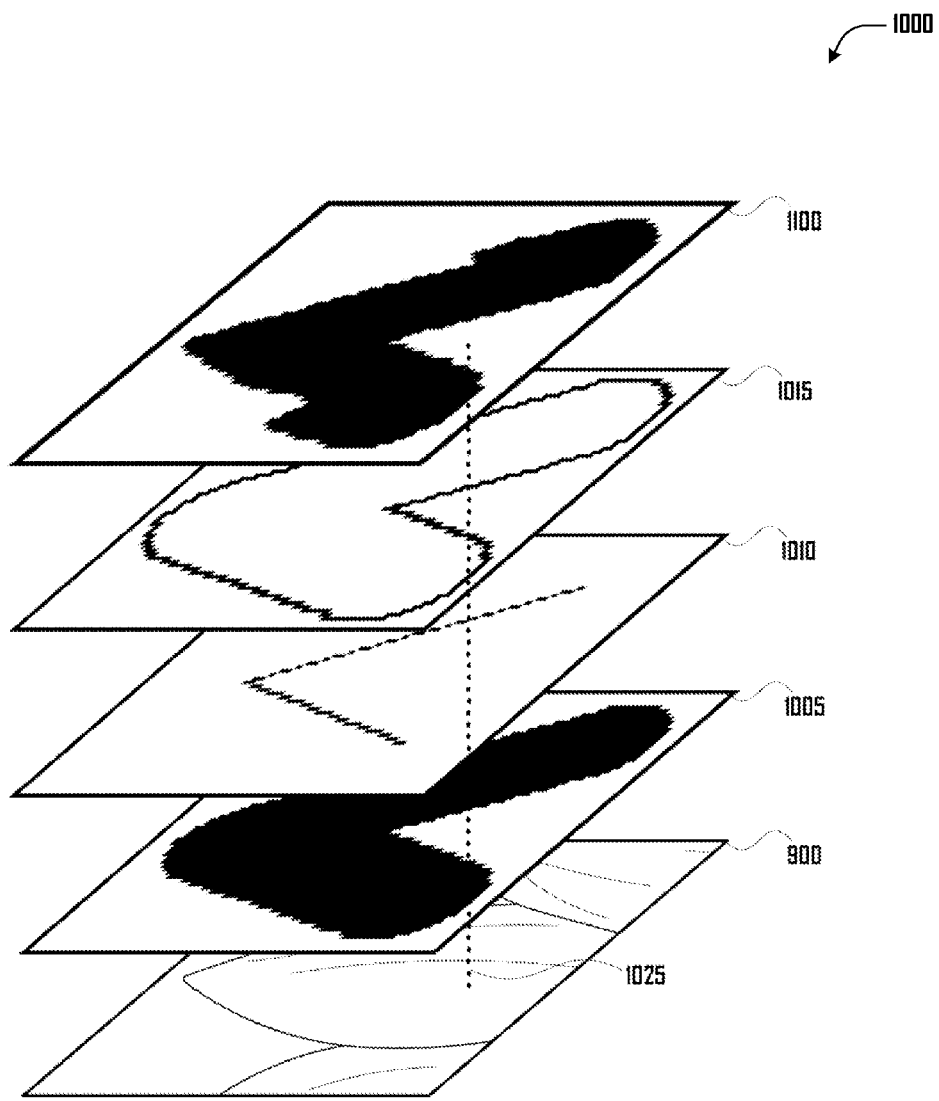
FIG. 10 is a graphical illustration of the content of Buffers R, D, B, P, and W.

As discussed further herein, the Client Device executes software routines such as a Stroke Input Process 500, an Object Detection Process 600, and a Filter and Effect Application Process 260. The Stroke Input Process 500 is used to receive stroke input from a user touching a touchscreen interface or otherwise providing user input (such as with a finger, stylus, mouse, through a gesture, or similar), which stroke input communicates the user's intention to identify pixels within the Buffer I 305 as comprising an object. It should be understood that references herein to "pixel" may refer, depending on the context, to the location of the pixel within a buffer and/or to colors encoded by the pixel; for example, when this paper discusses two pixels as being "corresponding" pixels in two different buffers, this should be understood to mean that the pixels occupy the same location in their respective buffers. The vertical dashed line in FIG. 10 illustrates this correspondence between pixels between five different buffers. In addition, as discussed herein, pixel buffers may be one dimensional (such as an alpha buffer) or multi-dimensional (such as buffers containing RGB data); generally, the context of the discussion communicates the difference. For example, a statement that a pixel is set to a value of 1 indicates that the buffer being discussed is one dimensional. Buffer dimensionality is a parameter that may be varied in an implementation, provided the underlying objective is achieved; for example, a multi-dimensional buffer may be treated as a one-dimensional buffer. Generally, the following Buffers discussed herein are one-dimensional: Buffer R 330, Buffer B 320, Buffer D 325, Buffer P 315, and Buffer M 335. Generally, the following Buffers discussed herein are multi-dimensional: Buffer W 310 and Buffer I 305. The Object Detection Process 600 identifies one or more pixel objects within the pixels which are the output of the Stroke Input Process 500, which pixel objects are saved to Buffer M (illustrated as "Buffer M" in FIG. 3 at element 335). As discussed further herein, pixels in Buffer I 305 corresponding to the pixels in Buffer M 335 may be the subject of the Filter and Effect Process 260, which routine may apply a filter or photographic effect. Pixels in Buffer I 305 corresponding to those in Buffer M 335 may also be prepared as an image separate from the rest of Buffer I 305.

This paper may discuss a first computer as connecting to a second computer (such as a first Client Device connecting to a second Client Device) or to a corresponding datastore (such as to Client Device Datastore 300); it should be understood that such connections may be to, through, or via the other of the two components (for example, a statement that a computing device connects with or sends data to the Client Device 200 should be understood as saying that the computing device may connect with or send data to the Client Device Datastore 300). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization.

FIG. 2 is a functional block diagram of an exemplary Client Device computing device and some data structures and/or components thereof. The Client Device 200 in FIG. 2 comprises at least one Processing Unit 210, Client Device Memory 250, a Display 240 and Input 245, all interconnected along with the Network Interface 230 via a Bus 220. The Processing Unit 210 may comprise one or more general-purpose Central Processing Units ("CPU") 212 as well as one or more special-purpose Graphics Processing Units ("GPU") 214. The components of the Processing Unit 210 may be utilized by the Operating System 255 for different functions required by the routines executed by the Client Device. The Network Interface 230 may be utilized to form connections with the Network 150 or to form device-to-device connections with other computers. The Client Device Memory 250 generally comprises a random access memory ("RAM"), a read only memory ("ROM"), and a permanent mass storage device, such as a disk drive or SDRAM (synchronous dynamic random-access memory). The Client Device Memory 250 stores program code for software routines, such as, for example, the Stroke Input Process 500, the Object Detection Process 600, and the Filter and Effect Process 260, as well as, for example, digital photograph taking routines, digital photograph processing and/or managing routines (of which the Filter and Effect Process 260 may be a subroutine), browser, email client and server routines, client applications, and database applications (discussed further below). In addition, the Client Device Memory 250 also stores an Operating System 255. These software components may be loaded from a non-transient Computer Readable Storage Medium 295 into Client Device Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The computing device 200 may also comprise hardware supporting input modalities, Input 245, such as, for example, a touchscreen, a camera, a keyboard, a mouse, a trackball, a stylus, gesture monitoring hardware, and a microphone. The Input 245 may also serve as a Display 240, as in the case of a touchscreen display which also serves as Input 245, and which may respond to input in the form of contact by a finger or stylus with the surface of the Input 245.

Figure 3:
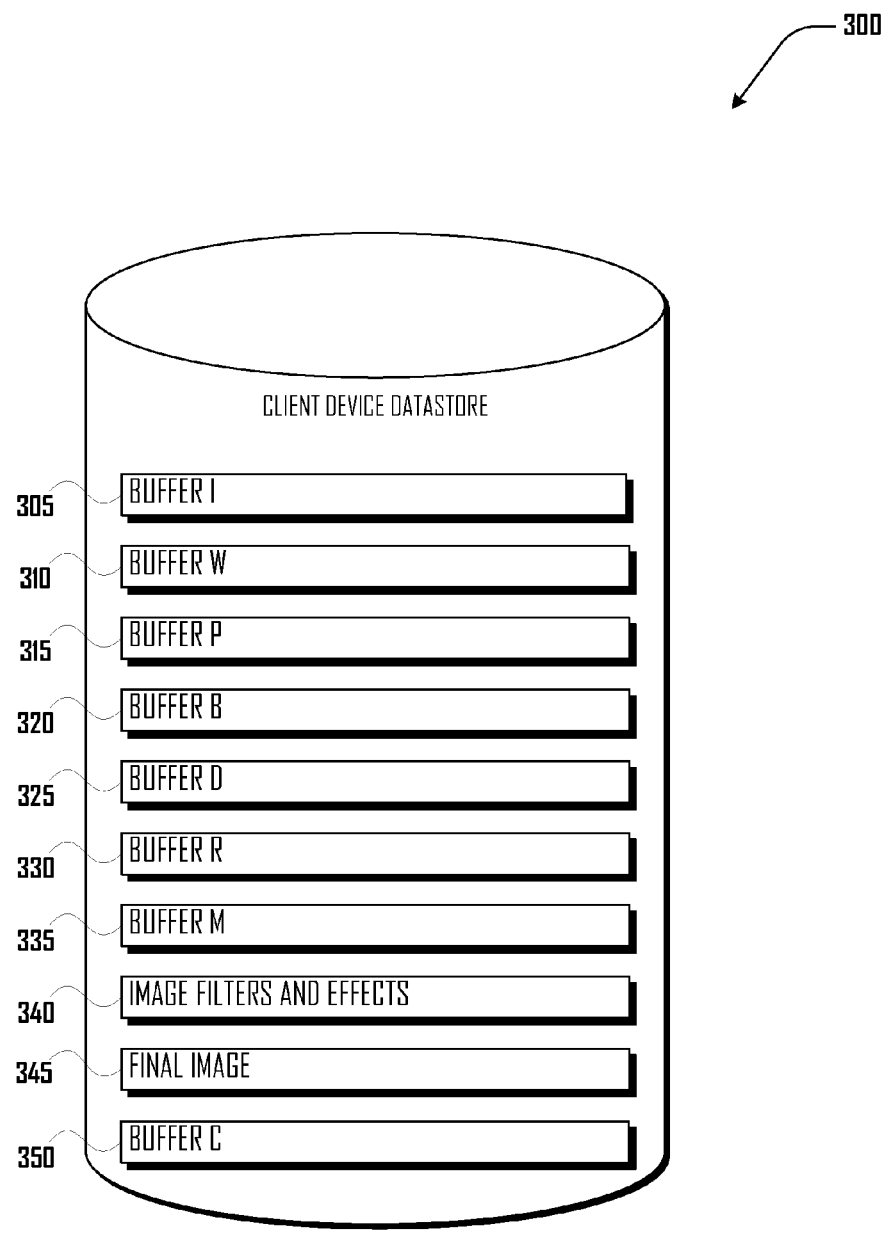
FIG. 3 is a functional block diagram of the Client Device Datastore illustrated in the computing device of FIG. 2.

The computing device 200 may also comprise or communicate via Bus 220 with Client Device Datastore 300, illustrated further in FIG. 3. In various embodiments, Bus 220 may comprise a storage area network ("SAN"), a high speed serial bus, and/or other suitable communication technology. In some embodiments, Client Device may communicate with the Client Device Datastore via Network Interface 230. The Client Device 200 may, in some embodiments, include many more components than those shown in this Figure. However, it is not necessary that all of these generally conventional components be shown in order to disclose an illustrative embodiment.

The Client Device 200 illustrated in FIG. 2 comprises data groups for routines, such as routines for a Stroke Input Process 500, an Object Detection Process 600, and a Filter and Effect Process 260. Additional data groups for routines, such as for a webserver and web browser, may also be present on and executed by the Client Device 200. Browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

FIG. 3 is a functional block diagram of the Client Device Datastore illustrated in the computing device of FIG. 2. The components of the Client Device Datastore 300 are data groups used by routines and are discussed further herein in the discussion of other of the Figures.

The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 4:
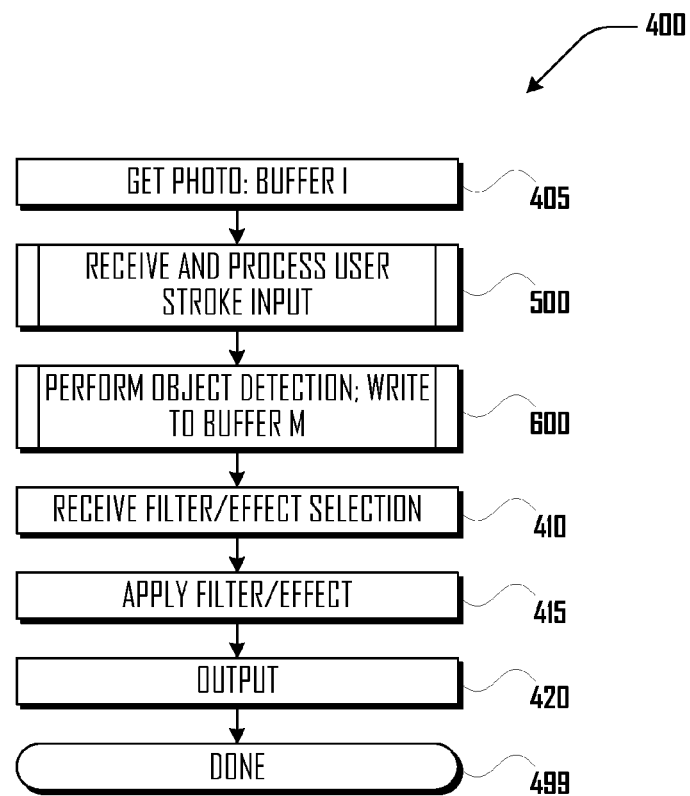
FIG. 4 is a flowchart illustrating a process in which a Client Device receives and processes user stroke input, performs object detection, applies a filter or effect, and outputs a final presentation.
Figure 8:
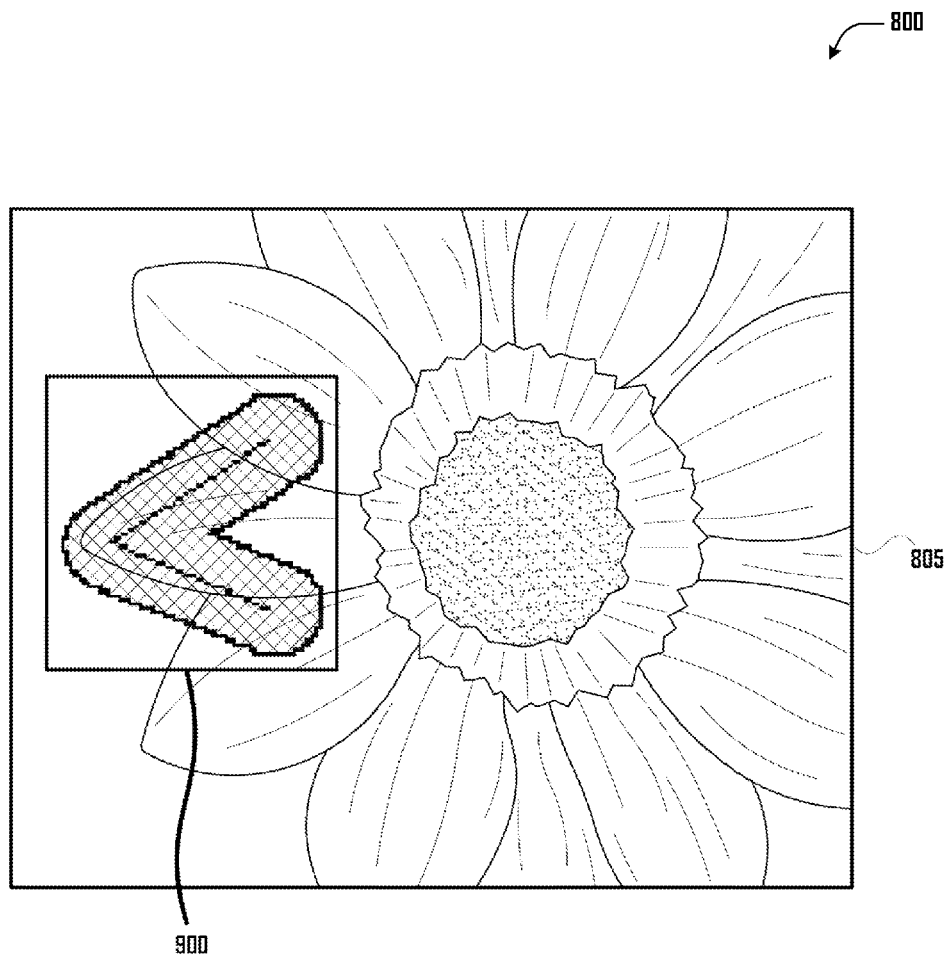
FIG. 8 is a graphical illustration of the content of Buffers W, I, P, B, and D.

FIG. 4 is a flowchart illustrating a process in which a Client Device receives and processes user stroke input, performs object detection, applies a filter or effect, and outputs a final presentation. At step 405, the Client Device obtains (or obtains access to) a digital photograph comprising pixels, which shall be referred to herein as Buffer I 305. Buffer I 305 is graphically illustrated as element 805 in FIG. 8 (element 900, also illustrated in FIG. 8, is not part of Buffer I 305). The obtained Buffer I 305 may be rendered, for example, by a digital photograph managing routine, in the Display 240 of the Client Device.

Figure 5:
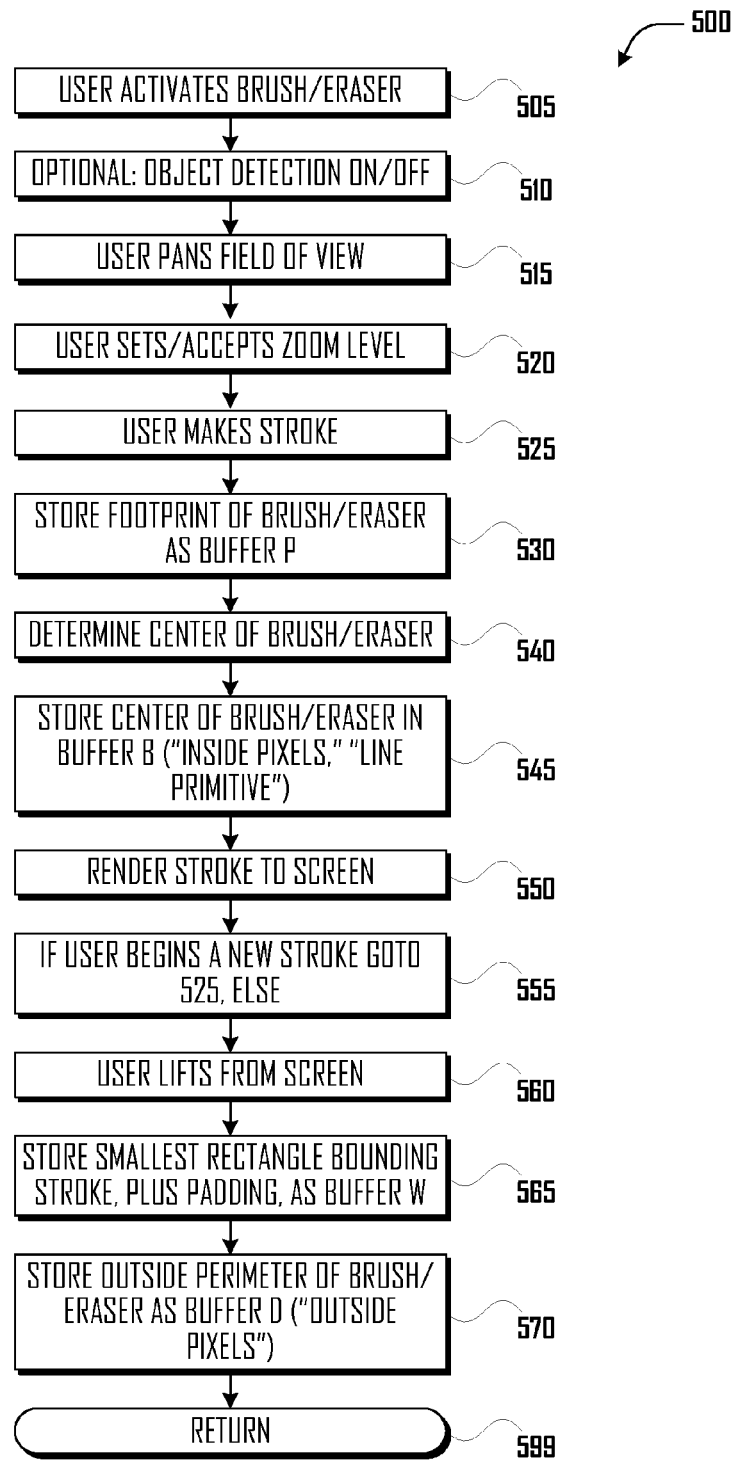
FIG. 5 is a flowchart illustrating a detail of a process for receiving and processing user stroke input.

At step 500, the Client Device receives and processes user stroke input through the Stroke Input Process 500, discussed at greater detail in relation to FIG. 5. As discussed elsewhere, the Stroke Input Process 500 receives stroke input from a user touching a touchscreen interface or otherwise providing user input (such as with a finger, stylus, mouse, through a gesture, or similar), which stroke input communicates the user's intention to identify pixels within the Buffer I 305 as comprising an object. As discussed further herein, the identified pixels may be visually distinguished in the Display 240, such as by a different color, brightness, tracing, and similar.

Figure 6:
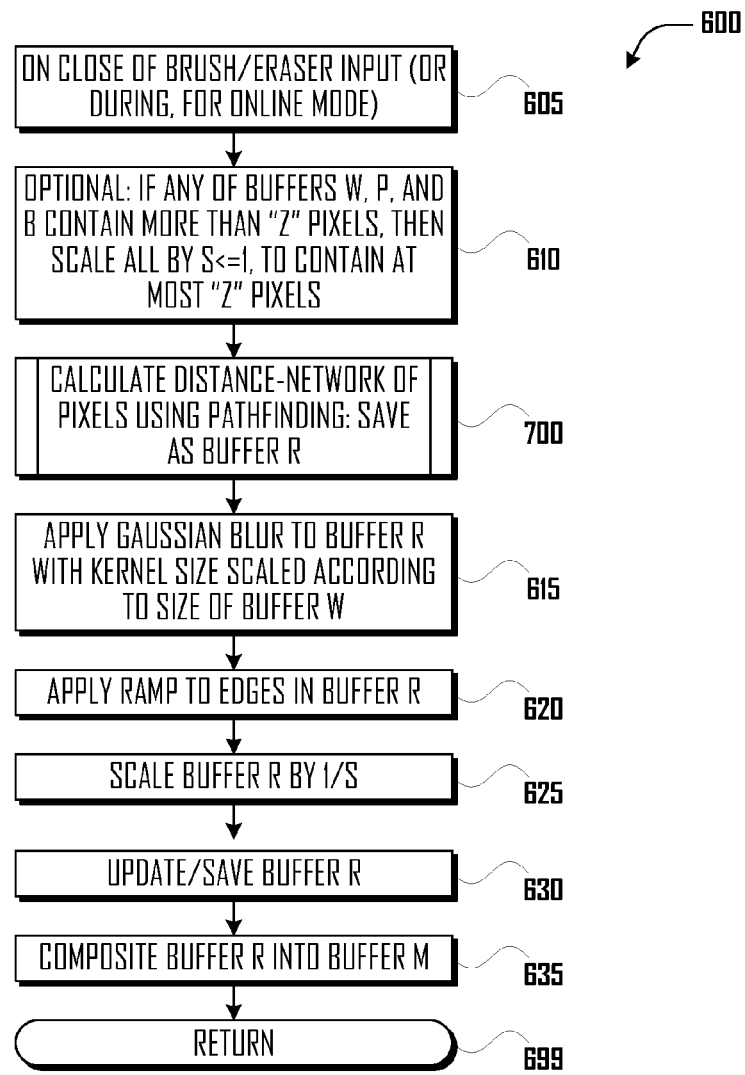
FIG. 6 is a flowchart illustrating a detail of a process for performing object detection.

At step 600, the Client Device performs pixel object detection utilizing, for example, the Object Detection Process 600, discussed at greater detail in relation to FIG. 6. As discussed elsewhere, the Object Detection Process 600 identifies one or more pixel objects bounded by color edges and proximate to the pixels within the output of the Stroke Input Process 500 (referred to herein as "objects"), which pixel objects are saved to a mask buffer, Buffer M (illustrated as "Buffer M" in FIG. 3 at element 335), which may be handled separately from Buffer I 305.

At step 410, the Client Device receives a filter or photograph effect selection, such as from the user of the Client Device utilizing the Filter and Effect Process 260. Examples of filters and effects comprise brightness, contrast, color saturation, white balance, sepia conversion, nostalgia filter, and simulation of chemical film processing. The data comprising the Filter and Effect Process 260 may be obtained from the Client Device Datastore 300 and the Image Filters and Effects 340 records. As noted elsewhere, Buffer M 335 may also be used for other purposes, for example, to identify pixels in Buffer I 305 which are to receive a filter or photographic effect or to identify pixels in Buffer I 305, which pixels may be copied, prepared, or otherwise output as an image separate from Buffer I 305. At step 415, the filter or photographic effect selection may be applied, such as by the Filter and Effect Process 260 routine, to pixels in Buffer I 305 which correspond to the pixels in Buffer M 335, producing, for example, Final Image 345. At step 420, the Final Image 345 or other result may be output, such as by being rendered on the Client Device Display 240. As described further herein, the process may iterate; during all iterations, the user may use an eraser tool to alter the pixels selected during step 500 and identified as objects during step 600.

FIG. 5 is a flowchart illustrating a detail of a process for receiving and processing user stroke input. The process illustrated in FIG. 5 may be performed by the Stroke Input Process 500. At step 505, the user activates a brush or an eraser tool in the user-interface of the Stroke Input Process 500 routine. The brush and eraser tools may operate in a similar manner, though with the result of the brush stroke adding input and the result of the eraser stroke removing the output of previously entered brush stroke input. The brush and/or eraser tools may have graphical footprints in the Display 240 of the Client Device which footprints may be slightly larger than the tip of a typical (or of the user's) index finger, so that the user can see the footprint of the tool in the Display 240. As with other of the outlined steps, step 510 is optional and/or may be performed in another order (such as prior to step 505); in step 510, pixel object detection, as may be performed by the Object Detection Process 600, may be deactivated (if it was active). At step 515, the user may pan the field of view of the Display 240 rendering Buffer I 305 and, at step 520, may set and/or accept a zoom level. As with other steps, these steps may be performed in a different sequence, relative to one another, and/or in a different order, relative to other steps; for example, the user may zoom and pan the rendering of Buffer I 305, prior to step 505. Panning and setting the zoom level in step 515 and 520 may be performed with a unique gesture or command, such as a two-finger "pinch," "spread," or other gesture different from the gesture used to provide brush or eraser input or following activation of a pan or zoom tool, such that the user-interface for the Client Device and the Stroke Input Process 500 can distinguish panning and zooming from utilization of the brush or eraser tools. The zoom level determines the resolution of pixels in Buffer W 310.

At step 525, the user makes a single stroke (for example, moves finger contact from one location, such as a pixel, to another on the device screen) without lifting from the screen with the brush or eraser tool activated. At step 530, the Stroke Input Process 500 stores the footprint of the brush or eraser into Buffer P 315 (element 1005 in FIGS. 9 and 10). Values of Buffer P 315 may be either one, for a pixel contained in the footprint, and zero otherwise (it would be understood that different pixel values may be used with corresponding effect). At step 540, the Stroke Input Process 500 determines the center of the brush or eraser across the path of the stroke input occurring in step 525. The center of the brush or eraser across this path may be determined relative to the center of the brush or eraser tool, which may be a fixed component of the tool (which may or may not be at the precise center of the graphical representation of the tool). The location of the center of the tool is sampled at the beginning and at the end of the stroke. Locations of the center of the tool between the sampled locations may be determined by, for example, determining a line between the sampled locations, such as using OpenGL®, using a linear mathematical line drawing function, using a mathematical spline function (to fit a curve across multiple sampled locations), or similar. The thickness assigned to the center of the brush or eraser may be a parameter of the Stroke Input Process 500 and may be set, for example, at one pixel. At step 545, the determined center of the brush or eraser stroke may be stored into Buffer B 320 (element 1010 in FIGS. 9 and 10). Values of Buffer B 320 may be either one, for a pixel determined to be part of the center of the brush path or zero, otherwise. The center of the brush or eraser across the path of the stroke input may also be referred to as the "inside pixels."

At step 550 the result may be rendered to the screen for visual feedback (if not already rendered), such as by rendering the content of Buffer P 315. While FIG. 10 illustrates the content of Buffer P 315 at element 1005 as black, the content of Buffer P 315 (or of other of the Buffers illustrated in FIG. 10) may be rendered as a half-tone, as a shaded or colored area, and/or with transparency to show underlying pixels from Buffer I 305.

At step 555, it is indicated that if the user strokes again, steps 525 to 555 may iterate.

At step 560 the user lifts the user's finger(s) (or stylus) from the Input 245 and/or Display 240 (such as from a touchscreen interface). In a non-touch interface, the "lift" may be communicating by the release of a mouse button (pressed to indicate the initial "touch"), by toggling a switch, or similar.

Figure 9:
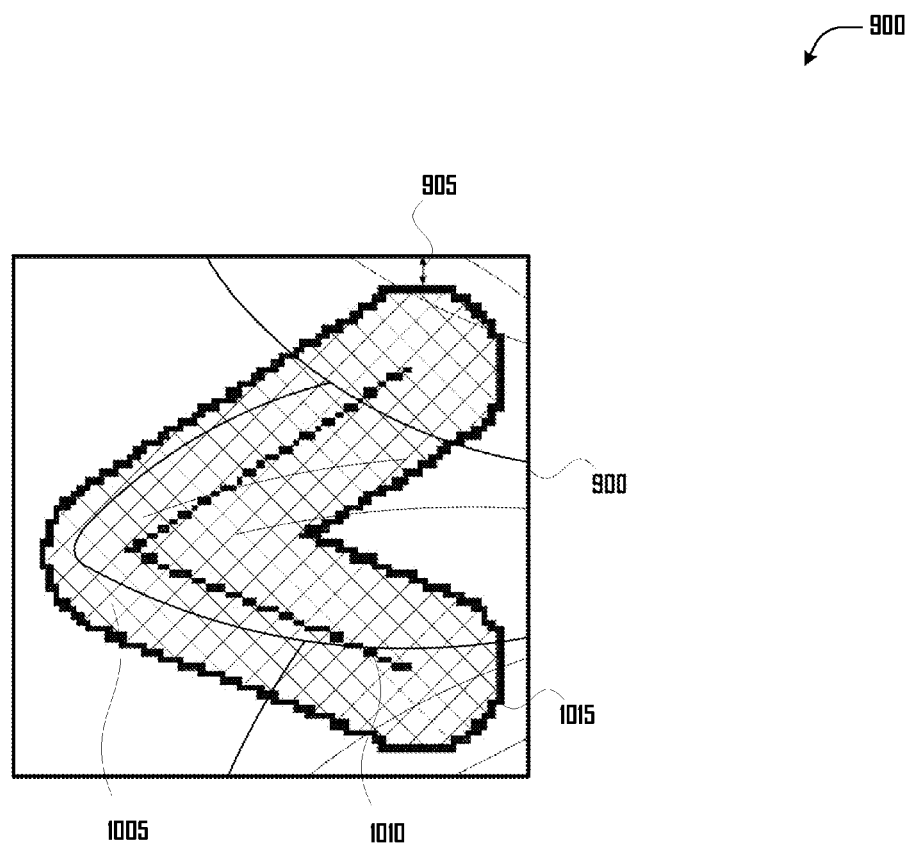
FIG. 9 is a graphical illustration of the content of Buffer W, P, B, and D.

At step 565, the Stroke Input Process 500 determines the smallest rectangle bounding the footprint of the input strokes made between steps 525 and 555, plus a padding amount, and stores pixels from Buffer I 305 corresponding to the rectangle as Buffer W 310. FIG. 8 graphically illustrates the content of Buffer W at element 900 (and Buffer I 305 at element 805; Buffers P, B, and D are also shown, but not numbered, in FIG. 8). FIG. 9 graphically illustrates Buffer W 310 at element 900, around a sample touch input stroke (saved in Buffer D 325 (element 1015 in FIGS. 9 and 10), Buffer B 320 (element 1010 in FIGS. 9 and 10), and Buffer P 315 (element 1005 in FIGS. 9 and 10)). FIG. 10 illustrates the buffers as separate layers. A graphical illustration of an example of the padding amount is illustrated in FIG. 9 at element 905.

At step 570, the Stroke Input Process 500 determines the outside perimeter of the brush or eraser footprints and stores this into Buffer D 325 (element 1015). Values of Buffer D 325 may be either one, for a pixel on the perimeter, or zero otherwise. Determination of the outside perimeter of the brush or eraser may be performed in various ways, an example of which is by analyzing the content of Buffer P 315 and determining for each pixel, "p" in Buffer P 315, what value the values of the eight neighboring pixels of p sum to. If the values of the eight neighboring pixels of p sum to eight or the value at p is zero, then p is not on the perimeter; otherwise p is on the perimeter. If p is on the perimeter, then a value of one is stored in Buffer D 325 at the position corresponding to p in Buffer P 315 and otherwise a value of zero is stored in the same position.

FIG. 6 is a flowchart illustrating a detail of a process for performing object detection. This process may be executed by, for example, the Object Detection Process 600. Step 605 illustrates that the prior step, step 500, has concluded or that this sub-routine may proceeding in parallel with step 500, as discussed further in relation to FIG. 12 (the "online mode"). While all of the steps discussed herein may be optional, step 610 illustrates an optional step in which a determination may be made regarding whether any of Buffers W, P, and B contain more than "Z" pixels. If this determination is affirmative, then all of Buffers W, P, and B may be scaled by S<=1, to contain at most Z pixels. This may be performed to reduce the processing time for the Object Detection Process 600.

At step 700, the Object Detection Process 600 creates a distance, cost, or graph-theoretic network of pixels relative to Buffers W, P, B, and D, and uses this network to label pixels in Buffer R 330 (illustrated in FIGS. 10 and 11 as element 110) as "inside" pixels (with a value of 1) or "outside" pixels (with a value of 0). This step is further illustrated and discussed in relation to FIG. 7.

At step 615, a Gaussian blur (or similar) is applied to Buffer R 330, with a kernel size scaled according to the size of Buffer W 310. Scaling the kernel size of the Gaussian blur ensures that the amount of blur is relative to the size of the window (i.e., smaller pixel windows are blurred less than larger windows of pixels). The effect of the Gaussian blur is graphically illustrated in FIG. 11, with element 1100 (graphically representing Buffer R 330) being transformed by the Gaussian blur to element 1105. A threshold function then applies a ramp to the edges in Buffer R 330. A sample threshold function is as follows (where "p" is a pixel):

$T(p)=$ $p < p0: 0$ $p >= p0$ and $p < p1: (p-p0)/(p1-p0)$ $p >= p1: 1$

Figure 11:
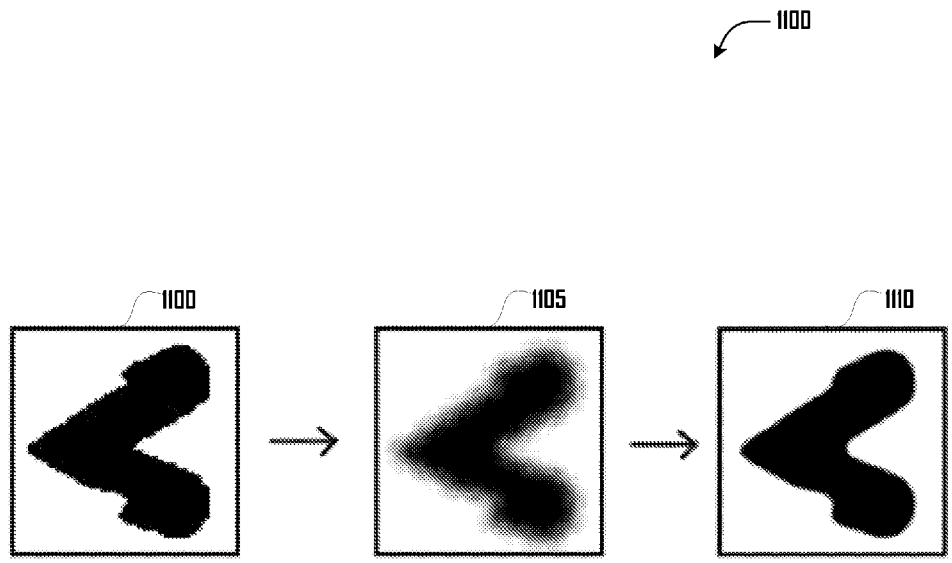
FIG. 11 is a graphical illustration of the content of Buffer R, application of a Gaussian filter, and application of a ramp function.

The effect of the threshold and ramp function is graphically illustrated in FIG. 11, with element 1105 being transformed by the threshold and ramp function to element 1110. The output of the threshold and ramp function may be saved back to (overwriting) Buffer R 330.

Step 625 then illustrates that Buffer R 330 may be scaled by 1/S (the inverse of step 610) to return to the original dimensions of Buffer W 310. At step 630, the output of step 625 may be saved to Buffer R 330. At step 635, Buffer R 330 may be composited into Buffer M. If the input is from the brush (a "paint"), then the compositing takes the maximum of the source (Buffer R 330) or the destination (Buffer M 335) pixels; if the input is from the eraser, the compositing takes the minimum of one minus the source pixel or one minus the destination pixel. In this way, the compositing operation ensures that successive results (from both brush and eraser) accumulate. A practitioner skilled in the art would recognize that there are equivalent variations to composite Buffer R 330 into Buffer M 335. The Object Detection Process 600 may then return to the process outlined in FIG. 4.

Figure 7:
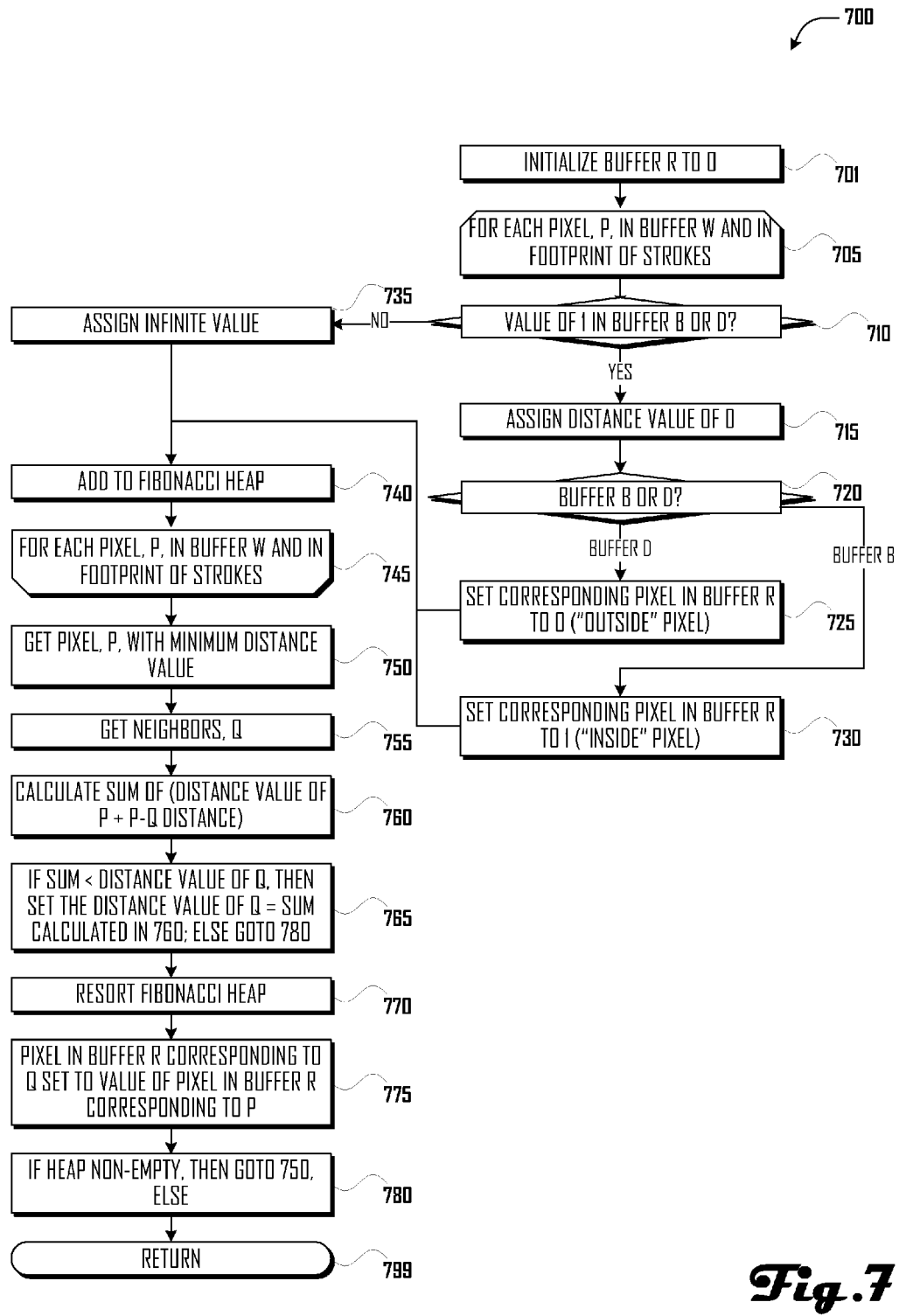
FIG. 7 is a flowchart illustrating an example of a detail of a process for creating a distance-network of pixels and using pathfinding in this network to determine object pixels.

FIG. 7 is a flowchart illustrating an example of a detail of a process for creating a distance-network of pixels and using pathfinding in this network to determine object pixels. The object of this flowchart is to find the shortest path between any pixel, p, in Buffer W 310 which has corresponding pixel with a value of 1 in Buffer P 315, to pixels with a value of 1 in either Buffer B 320 or Buffer D 325. Finding the shortest path can be determined through a variety of means, including, for example, through use of Dijkstra's algorithm, the Bellman-Ford Algorithm, the A* search algorithm, the Floyd-Warshall algorithm, or the Johnson's algorithm. FIG. 7 illustrates an efficient method for performing this operation through the use of Dijkstra's algorithm and a Fibonacci Heap as an ordered data structure.

At step 701, pixels in Buffer R 330 are initialized to an initial value of zero. Steps 705 to 745 iterate for each pixel, p, in Buffer W 310, which also lie in the footprint of the strokes (which have a value of 1 in corresponding pixels in Buffer P 315). At step 710, a determination is made regarding whether p has a value of 1 in corresponding pixels in Buffer B 320 or in Buffer D 325. If p does not have a value of 1 in corresponding pixels in Buffer B 320 or in Buffer D 325, then at step 735, an infinite (or maximum or very large) distance value is assigned to p in Buffer W 310. If p does have a value of 1 in corresponding pixels in Buffer B 320 or in Buffer D 325, then, at step 715, p is assigned a distance value of 0. At step 720 a determination may be made (if not already made) regarding whether the corresponding pixel was in Buffer B 320 or in Buffer D 325. If the corresponding pixel was in Buffer D 325, then at step 725 the corresponding pixel in Buffer R 330 is set to 0 (the pixel is an "outside" pixel). If the corresponding pixel was in Buffer B 320, then at step 730 the corresponding pixel in Buffer R 330 is set to 1 (the pixel is an "inside" pixel). The pixel, p, is, at step 740, added to a Fibonacci Heap and then, at step 745, the process returns to step 705 to iterate through all of the pixels, p, in Buffer W 310, which also lie in the footprint of the strokes (which have a value of 1 in corresponding pixels in Buffer P 315).

When all of the pixels, p, have been added to the Fibonacci Heap, at step 750 a pixel, p, in the Heap with a minimum distance value is obtained. At step 755, the neighbors, q, of p are obtained. At step 760 the sum of the distance value of p plus the p–q distance is calculated. The p–q distance may be, for example, the Euclidean distance between the colors in each of the two pixels taking the red, green, and blue components (in [0,1]) as coordinates in the distance function (obtaining pixel colors from Buffer W 310). At step 765, if the result of the sum in step 760 is less than the distance value of q, then the distance value of q is (re)set to be equal to the result calculated in step 760; if not (if else), the process goes to step 780. At step 770 the Fibonacci Heap is resorted by minimum distance value. At step 775, the value of the pixel in Buffer R 330 corresponding to pixel q is set to the value of the pixel in Buffer R 330 corresponding to pixel p. At step 780, if the Fibonacci Heap is non-empty, then the process returns to step 750, else the process Returns 799 to FIG. 6 (and step 615).

FIG. 8 is a graphical illustration of the content of Buffers W, I, P, B, and D. FIG. 8 is discussed in relation to other of the Figures.

FIG. 9 is a graphical illustration of the content of Buffer W, P, B, and D. FIG. 9 is discussed in relation to other of the Figures.

FIG. 10 is a graphical illustration of the content of Buffers R, D, B, P, and W. FIG. 10 is discussed in relation to other of the Figures.

FIG. 11 is a graphical illustration of the content of Buffer R, application of a Gaussian filter, and application of a ramp function. FIG. 11 is discussed in relation to other of the Figures.

Figure 12:
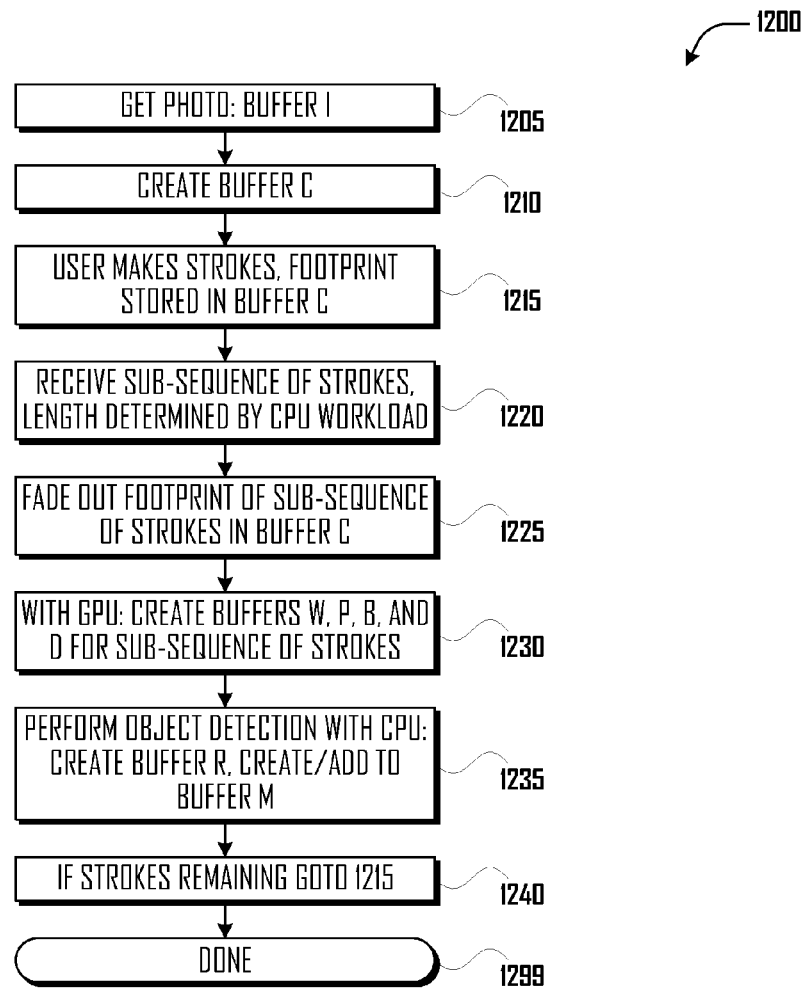
FIG. 12 is a flowchart illustrating a process in which a Client Device receives and processes user stroke input and performs object detection in parallel.

FIG. 12 is a flowchart illustrating a process in which a Client Device receives and processes user stroke input and performs object detection in parallel. In the process illustrated in FIG. 4, the Stroke Input Process 500 and the Object Detection Process 600 are performed substantially in series. In the process outlined in FIG. 12, these processes are performed substantially in parallel, with the Object Detection Process 600 ("pathfinding") being performed substantially by the CPU 212 while the Stroke Input Process 500 ("painting") is performed substantially by the GPU 214.

At step 1205, the Client Device obtains (or obtains access to) a digital photograph comprising pixels, which shall be referred to herein as Buffer I 305. The obtained Buffer I 305 may be rendered, for example by a digital photograph managing application, in the Display 240 of the Client Device. At or prior to step 1210, the brush or eraser tool in the Stroke Input Process 500 has been activated (similar to step 505) and the user has panned and zoomed the rendering of Buffer I 305 (similar to steps 515 and 520).

At step 1210, Buffer C 350 is created. Buffer C 350 holds the footprint of the brush or erase strokes, similar to Buffer P 315, though now Buffer C 350 is rendered to the Display 240, in order to provide the user with visual feedback, because Buffer P 315 only holds the then-current brush or eraser footprint corresponding to the stroke sub-sequence (on the then-current pass through 1220 to 1240). As with Buffer M 335, Buffer C 350 may persist for all input strokes. In subsequent steps, it should be understood that any modifications to Buffer C 350 will also be rendered on the Display 240.

At step 1215, the user makes one or many strokes, during which (in parallel) step 1220 is executed. These strokes are stored into Buffer C 350.

At step 1220, the Client Device receives and processes a user input stroke sub-sequence (a portion of the user input strokes). Steps 1220 to 1240 are executed on a dedicated thread, and, dependent on workload and client device capabilities, multiple instances of steps 1220 to 1240 could be compatibly executed in parallel (each on its own thread). The length of the sub-sequence may be a fixed unit determined by, for example, the passage of a unit of time or by a number of pixels traversed, or the length of the sub-sequence may be dynamically determined by the then-current workload of the CPU 212; for example, if the CPU 212 has a comparatively low workload, then the sub-sequence may be selected to be smaller. The user input stroke sub-sequence may be received and processed generally according to the Stroke Input Process 500 ("painting") by the GPU 214, but the parallel Object Detection Process 600 ("pathfinding") is performed substantially by the CPU 212, thus the length of the sub-sequence may be determined by the then-current workload of the CPU 212.

At step 1225, the footprint for the stroke sub-sequence is faded (or given a different brightness, color, transparency, etc.) in Buffer C 350 (or otherwise the user interface optionally communicates to the user that the previous sub-stroke sequence has been processed).

At step 1230, the GPU 214 creates Buffers W (310), P (315), B (320), and D (325), according to the process for creating these buffers described above in relation to FIG. 5, since a sequence of strokes can be processed by iterating between steps 525 and 545, once for each stroke in the sequence (step 550 is excluded from this loop because the rendering function is already accomplished with the use of Buffer C 350)

At step 1235, object detection is performed by the Object Detection Process 600, as described above in relation to FIG. 6, though now step 635 (compositing of Buffer R 330 into Buffer M 335) is also performed in a thread-safe manner, such that the input stroke sub-sequence results from each thread executing steps 1220 to 1240 are combined sequentially and in the proper order. At step 1240, the process may then return to step 1215 (with the process's continuing receptivity to input strokes being governed by a timer, by a controller in the user interface, or similar).

Figure 13:
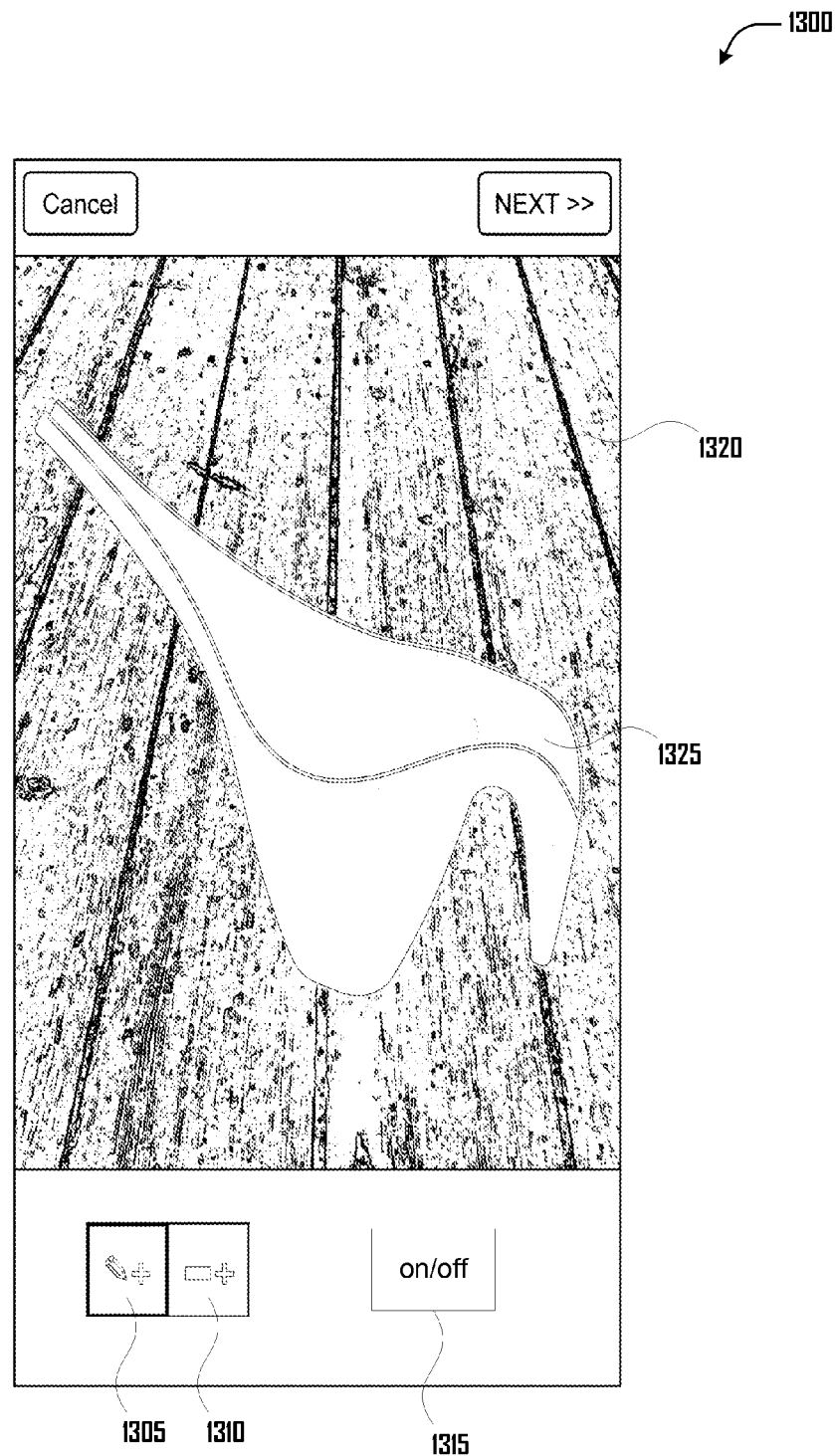
FIG. 13 is an illustration of a user interface demonstrating an embodiment.

FIG. 13 is an illustration of a user interface demonstrating an embodiment. In this illustration, a photograph 1320 is rendered comprising a water pitcher 1325 as well as tools for, for example, painting 1305, erasing 1310, and turning object detection on/off 1315. Other tools may be provided, such as tools for activating the user input interface, refreshing object detection, and a palette of photographic effects.

Figure 14:
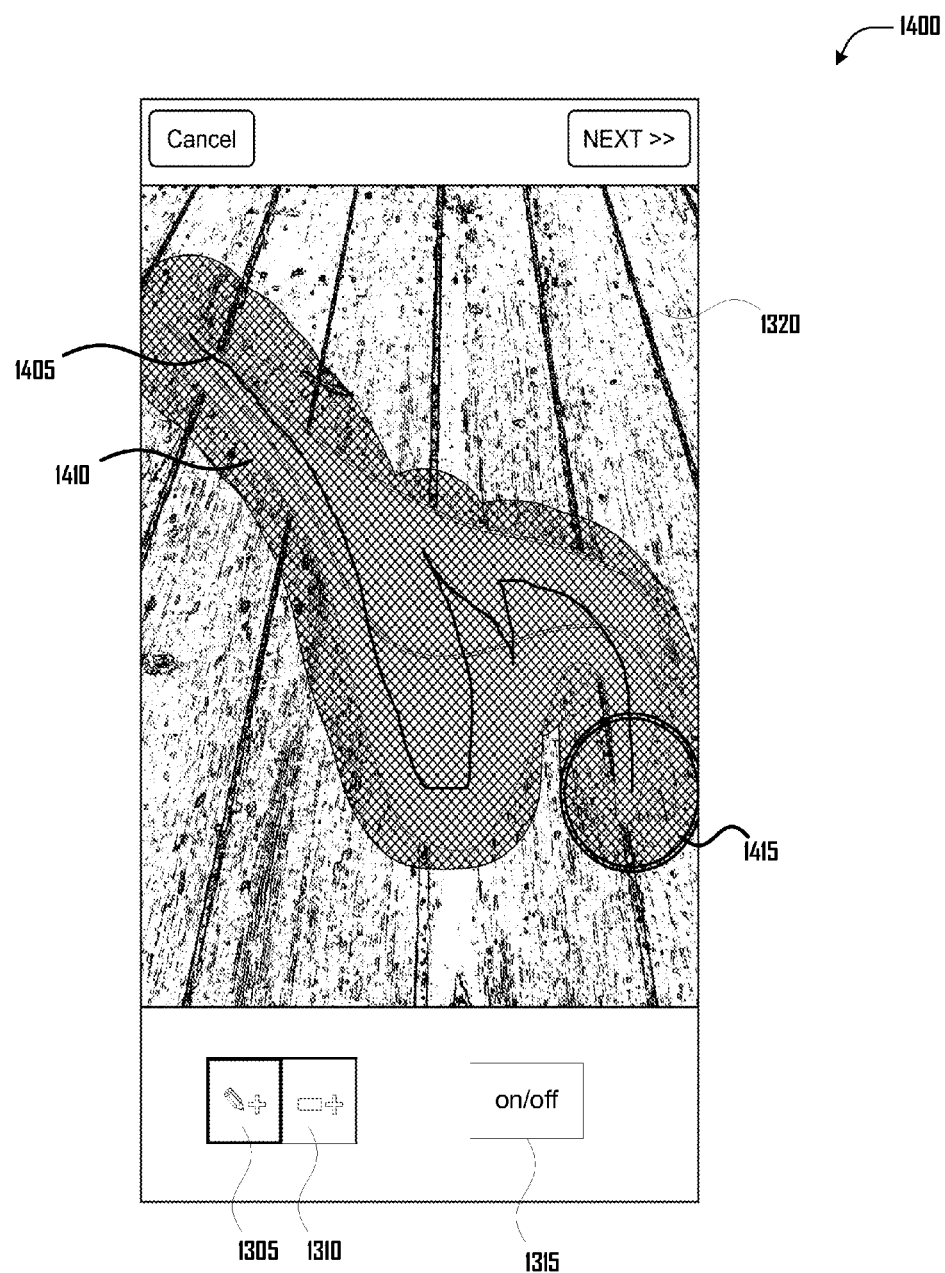
FIG. 14 is an illustration of a user interface demonstrating an embodiment in which user stroke input has been received.

FIG. 14 is an illustration of a user interface demonstrating an embodiment in which user stroke input has been received. The stroke input has been received along line 1405, illustrating Buffer B 310. The tool is the paint tool. The footprint of the paint tool is illustrated by circle 1415, with the area encompassed by the path of the footprint across the photograph, stored in Buffer P 315, being illustrated by area 1410, which area is illustrated with a diamond-pattern cross-hatching.

Figure 15:
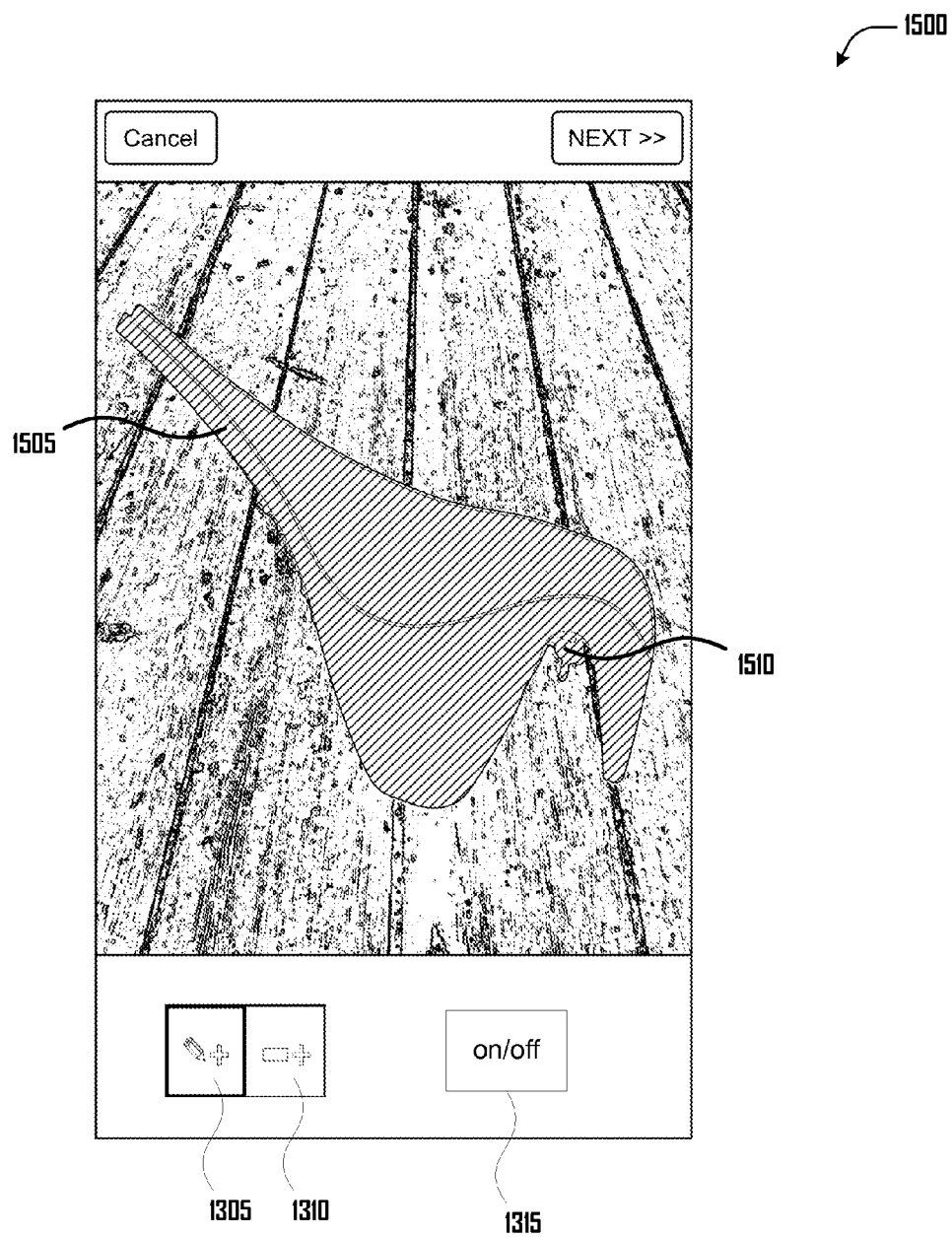
FIG. 15 is an illustration of a user interface demonstrating an embodiment in which user stroke input of FIG. 14 has been received and processed to identify objects.

FIG. 15 is an illustration of a user interface demonstrating an embodiment in which user stroke input of FIG. 14 has been received and processed to identify objects. The identified objects comprise the Area 1505, which Area 1505 is illustrated with diagonal cross-hatching. This Area 1505 is within the footprint of area 1410 and corresponds to pixels in Buffer M 335. This Area comprises Erase Area 1510, which Erase Area 1510 is to be erased in FIGS. 16 and 17.

Figure 16:
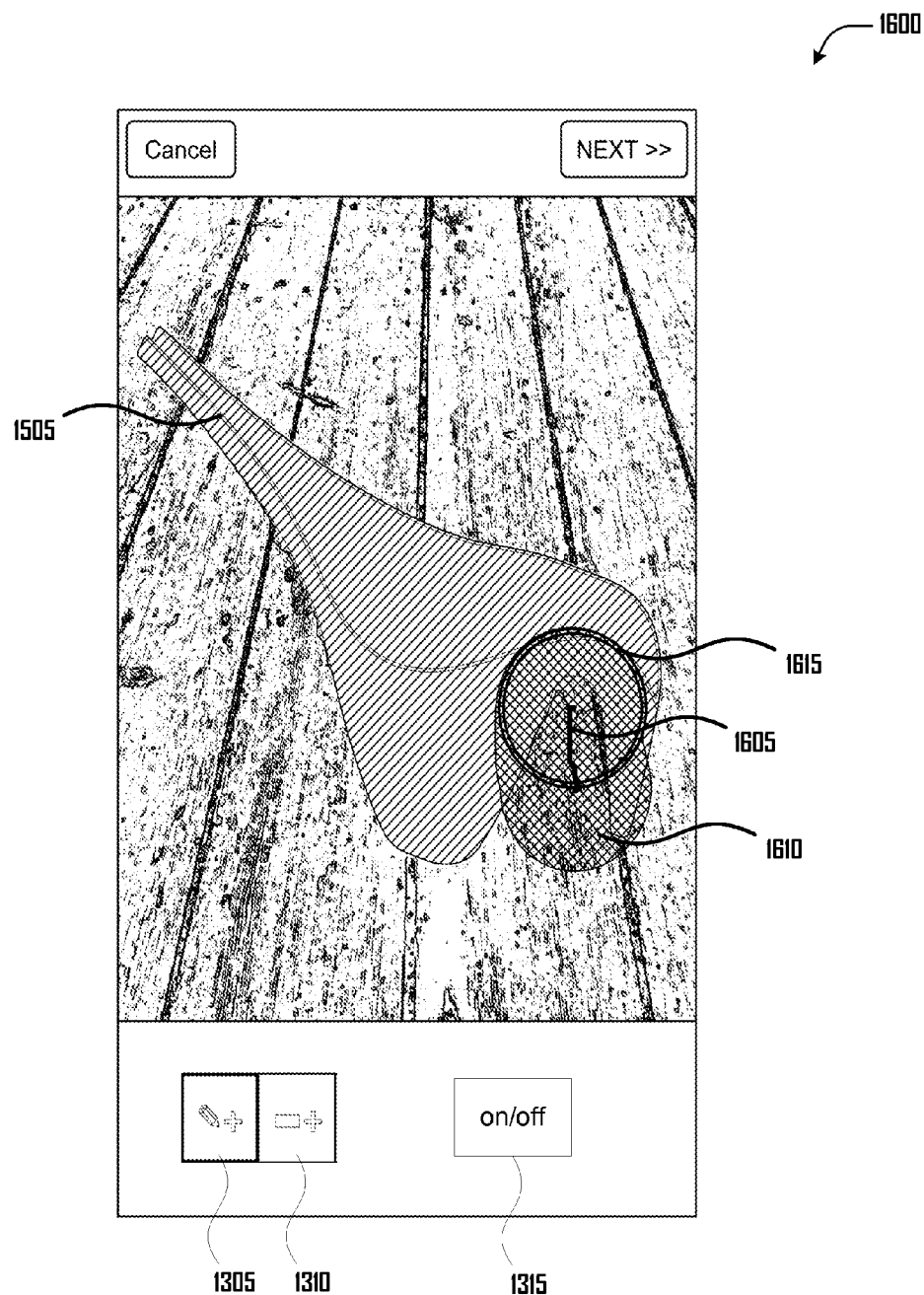
FIG. 16 is an illustration of a user interface demonstrating an embodiment in which user stroke input is directed to the Erase Area in FIG. 15, which Erase Area is to be removed as an object.

FIG. 16 is an illustration of a user interface demonstrating an embodiment in which user stroke input is directed to the Erase Area in FIG. 15, which Erase Area is to be removed as an object. Line 1605 illustrates the stroke input path for the erase tool. Area 1610 illustrates the footprint of the path of the erase tool utilized in FIG. 16. Area 1615 illustrates the footprint of the erase tool utilized in FIG. 16, after the erase tool has come to rest.

Figure 17:
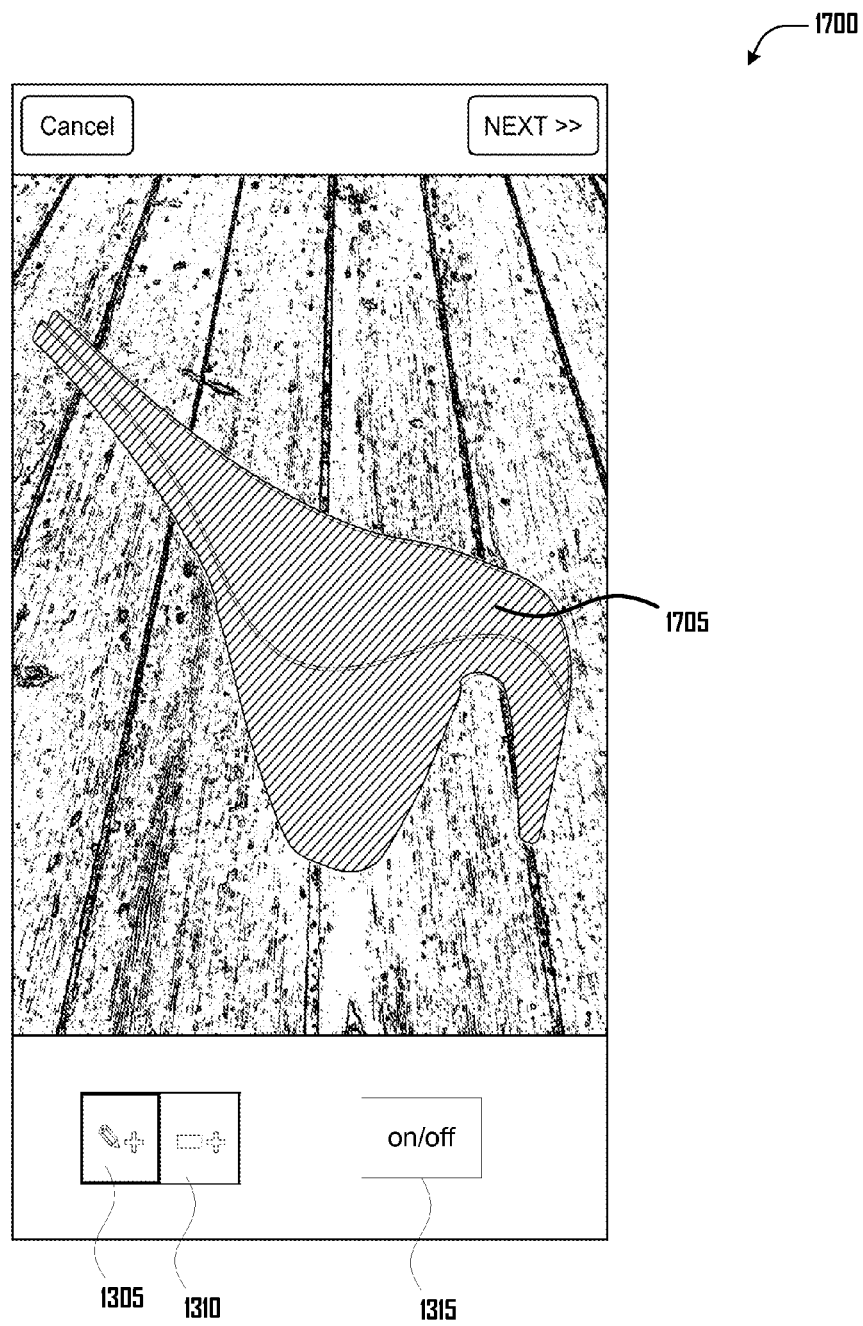
FIG. 17 is an illustration of a user interface demonstrating an embodiment illustrating the result of FIG. 16.

FIG. 17 is an illustration of a user interface demonstrating an embodiment illustrating the result of FIG. 16. Area 1705 illustrates the revised object, in which Area 1705 is illustrated with diagonal cross-hatching, with an object identified in the area of Area 1610 having been removed from Area 1505. An effect or filter may now be applied to the identified object in Area 1705.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A method of detecting objects in a digital image in a computer comprising a memory, comprising:
   obtaining, in a first buffer in the memory, a digital image comprising pixels;
   rendering the digital image in a display of the computer;
   receiving user stroke input relative to the first buffer in a touch-sensitive input interface of the computer;
   performing pixel object detection on pixels corresponding to the received user stroke input; and
   saving the output of the pixel object detection in a second buffer in the memory
   wherein performing pixel object detection comprises:
   calculating a network theoretic graph of the pixels corresponding to the received user stroke input, performing object detection utilizing the network theoretic graph of the pixels, and saving the output of the object detection in a third buffer;
   applying a Gaussian blur to the pixels in the third buffer;
   applying a ramp to the edges in the third buffer; and
   compositing the third buffer into the second buffer.

2. The method according to claim 1, wherein receiving user stroke input further comprises:
   receiving user input to activate a stroke input tool;
   storing the footprint of the stroke input in a fourth buffer;
   determining a line of pixels corresponding to the path of the center of the stroke input across the input interface and storing the line of pixels in a fifth buffer;
   determining a rectangle bounding the user stroke input and storing the pixels from the first buffer which correspond to the determined rectangle in a sixth buffer;
   storing the perimeter of the stroke input in a seventh buffer; and
   wherein performing pixel object detection further comprises, prior to calculating the network theoretic graph, determining that any of the fifth, sixth, and fourth buffers contain more than a first number of pixels and scaling the fifth, sixth, and fourth buffers by a first factor to contain at most the first number of pixels.

3. The method according to claim 2, further comprising scaling the third buffer by the inverse of the first factor.

4. The method according to claim 2, wherein the stroke input tool comprises at least one of a brush or an eraser and wherein one or more pixel objects determined from input from the eraser input tool cancel one or more pixel objects determined from input from the brush input tool.

5. The method according to claim 2, wherein the performing pixel object detection utilizing the network theoretic graph of the pixels comprises, determining the network theoretic path for a pixel in the sixth buffer to non-zero valued pixels in the fifth buffer and non-zero valued pixels in the seventh buffer and assigning a value of one to the pixel in the sixth buffer if the pixel in the sixth buffer has a shortest network theoretic graph path to a non-zero value pixel in the fifth buffer and a value of zero to the pixel in the sixth buffer if the pixel has a shortest network theoretic graph path to a non-zero value pixel in the seventh buffer.

6. The method according to claim 1, wherein the performing pixel object detection utilizing the network theoretic graph of the pixels comprises determining a distance between neighboring pixels using the red, green, and blue components of the pixels corresponding to the received user stroke input as coordinates in a Euclidean distance function.

7. The method according to claim 1, wherein the performing pixel object detection utilizing the network theoretic graph of the pixels comprises utilizing Dijkstra's Algorithm and a Fibonacci Heap to store network nodes, wherein the pixels correspond to the network nodes.

8. The method according to claim 1, further comprising scaling the third buffer by the inverse of the first factor.

9. The method according to claim 1, wherein the stroke input tool comprises at least one of a brush or an eraser and wherein one or more pixel objects determined from input from the eraser input tool cancel one or more pixel objects determined from input from the brush input tool.

10. The method according to claim 1, wherein the performing pixel object detection utilizing the network theoretic graph of the pixels comprises, determining the network theoretic path for a pixel in the fourth buffer to non-zero valued pixels in the fifth buffer and non-zero valued pixels in the sixth buffer and assigning a value of one to the pixel in the fourth buffer if the pixel in the fourth buffer has a shortest network theoretic graph path to a non-zero value pixel in the fifth buffer and a value of zero to the pixel in the fourth buffer if the pixel has a shortest network theoretic graph path to a non-zero value pixel in the sixth buffer.

\* \* \* \* \*